No. 778,031. PATENTED DEC. 20, 1904.
G. H. GRIMM.
SAP SPOUT AND COVER.
APPLICATION FILED MAY 16, 1904.
NO MODEL. 3 SHEETS—SHEET 1.
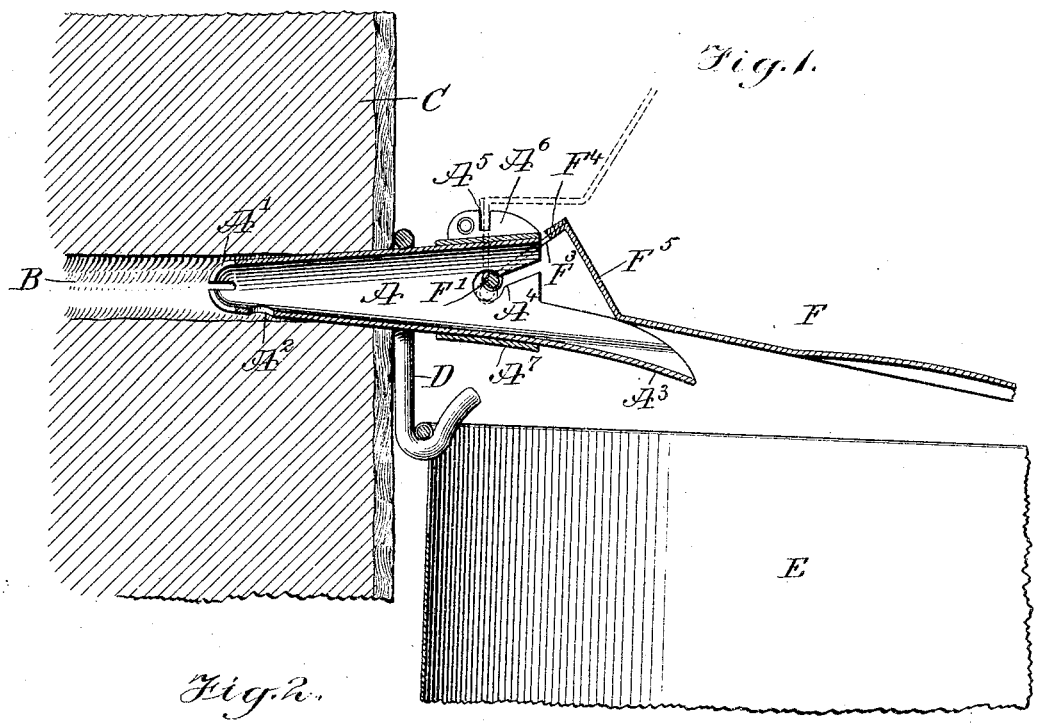
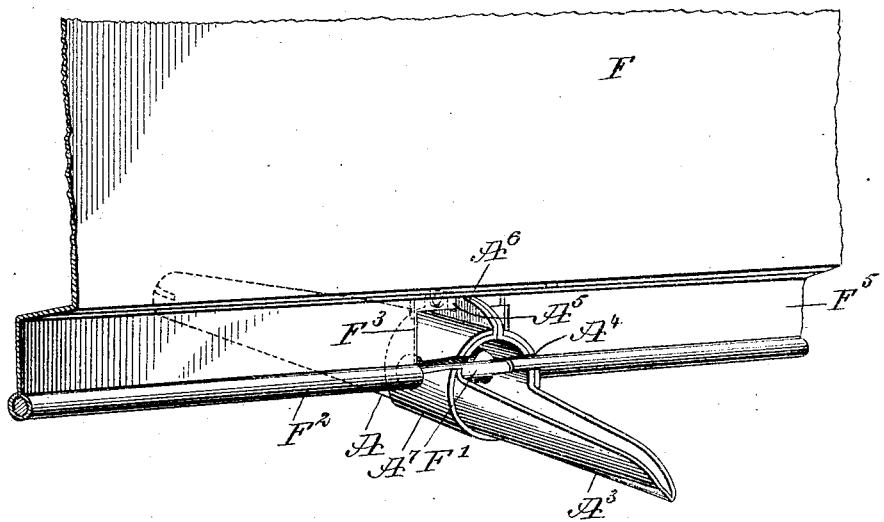
WITNESSES:
INVENTOR
Gustav H. Grimm
BY
ATTORNEYS No. 778,031. PATENTED DEC. 20, 1904.
G. H. GRIMM.
SAP SPOUT AND COVER.
APPLICATION FILED MAY 16, 1904.
NO MODEL. 3 SHEETS—SHEET 2.
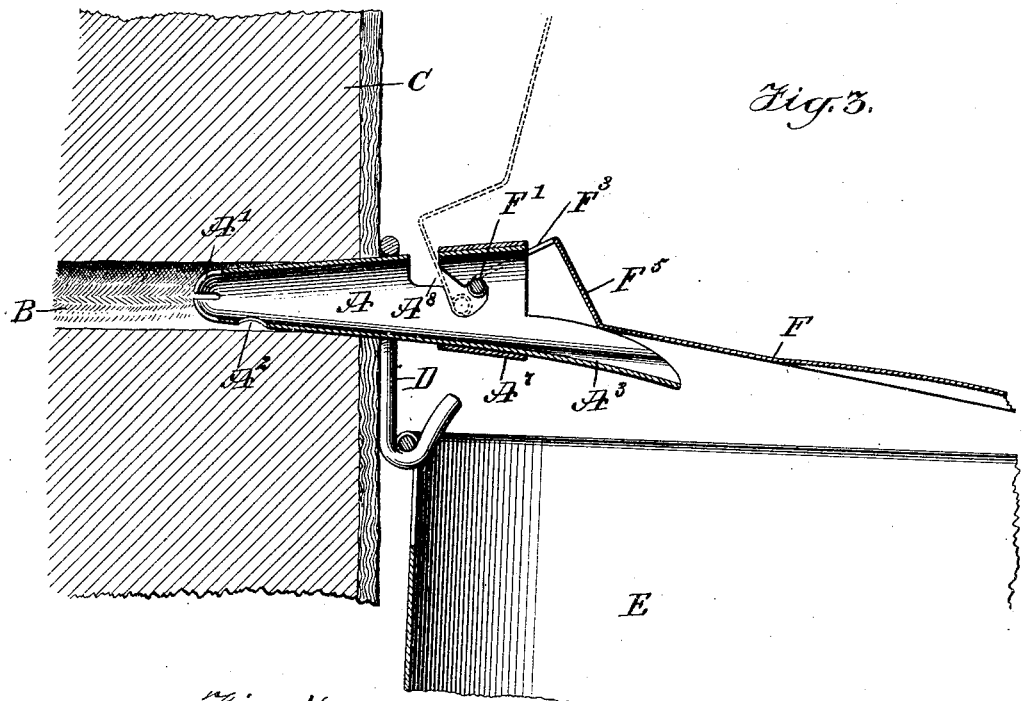
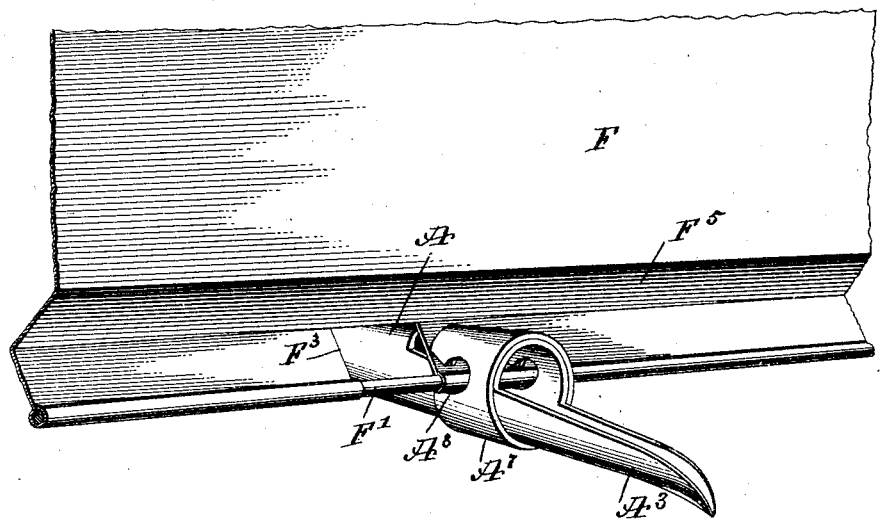
WITNESSES:
INVENTOR
Gustav H. Grimm
BY
ATTORNEYS

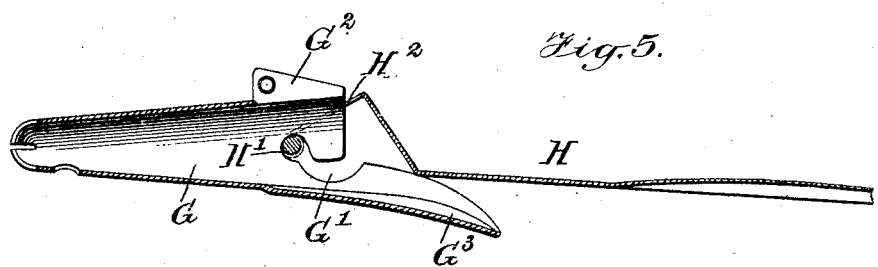
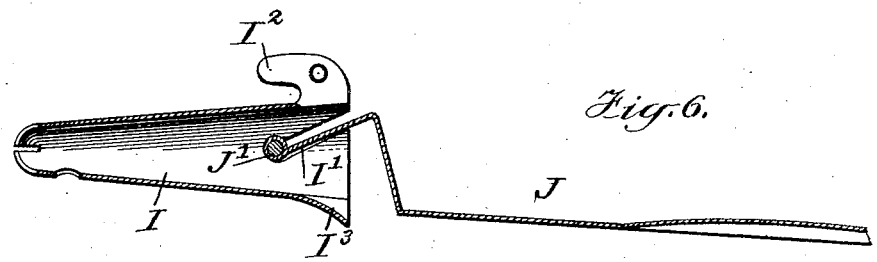
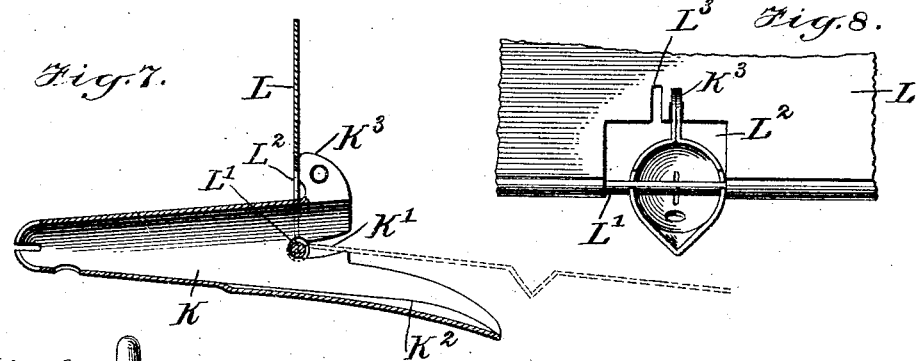
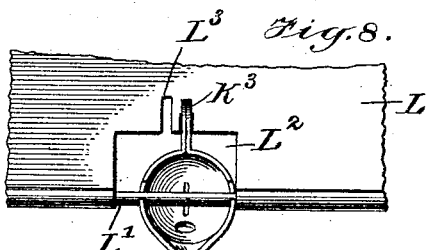
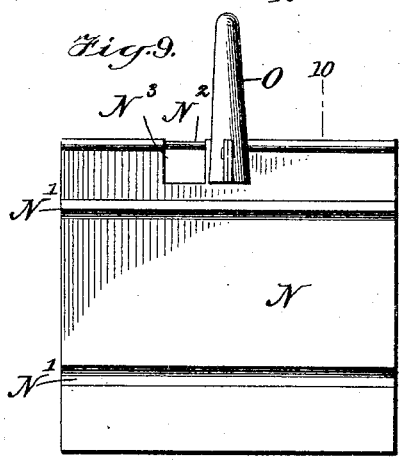
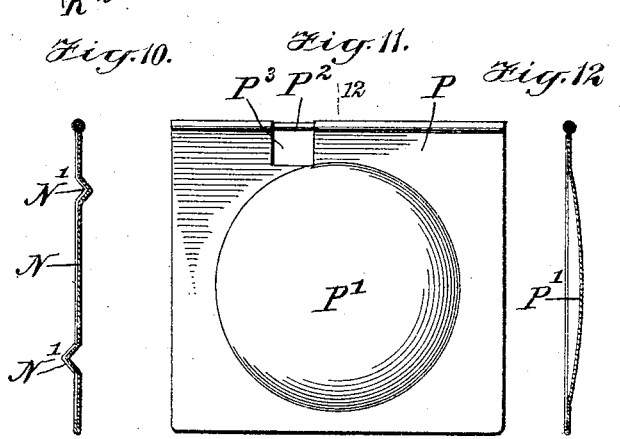

No. 778,031.

Patented December 20, 1904.

UNITED STATES PATENT OFFICE.

GUSTAV HENRY GRIMM, OF RUTLAND, VERMONT.

SAP-SPOUT AND COVER.

SPECIFICATION forming part of Letters Patent No. 778,031, dated December 20, 1904.

Application filed May 16, 1904. Serial No. 208,136.

*To all whom it may concern:*

Be it known that I, GUSTAV HENRY GRIMM, a citizen of the United States, and a resident of Rutland, in the county of Rutland and State of Vermont, have invented a new and Improved Sap-Spout and Cover, of which the following is a full, clear, and exact description.

The invention relates to the maple-sugar industry; and its object is to provide a new and improved sap-spout and cover arranged to insure a free flow of the sap from the tree to the bucket; to allow swinging the cover into a rest position and locking it against downward swinging while examining the contents of the bucket or emptying the latter; to protect the contents of the bucket against snow, rain, sleet, leaves, &c., and to allow proper ventilation of the bucket and to hold the cover against swaying in the wind.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement as applied. Fig. 2 is a perspective view of the improvement, showing the cover swung back and held against downward swinging. Fig. 3 is a sectional side elevation of a modified form of the improvement as applied. Fig. 4 is a perspective view of the improvement, showing the cover swung back and locked in place. Figs. 5, 6, and 7 are sectional side elevations of other modified forms of the improvement. Fig. 8 is a front elevation of the modified form shown in Fig. 7. Fig. 9 is a plan view of a modified form of the improvement. Fig. 10 is a transverse section of the same on the line 10 10 of Fig. 9. Fig. 11 is a plan view of another modified form of the cover, and Fig. 12 is a transverse section of the same on the line 12 12 of Fig. 11.

The improvement, as illustrated in Figs. 1 and 2, consists, essentially, of a conical spout A, adapted to be driven into the bore B of a tree C, and on the said spout is hung a hook D for supporting a bucket E, normally covered by a cover F to protect the contents of the bucket against snow, rain, leaves, &c.

The spout A is provided at its inner or apex end with suitable slits $A'$ for the sap to pass into the spout from the bore, and in the bottom of the spout, near the rear end, is a drain-opening $A^2$ for completely draining the bore B of sap. The forward end of the spout A is provided at its bottom with an integral lip $A^3$, extending downwardly and forwardly to cause the sap running through the spout to be projected into the bucket E without danger of spilling the same.

The spout A is provided at its forward or base end with a transversely-extending opening or bayonet-slot $A^4$, engaged by a pivot or pintle $F'$ in the form of a piece of wire, held in a seam $F^2$ on the rear end of the cover F, the wire reinforcing the rear end of the cover and at the same time forming a pivot to permit of swinging the cover F into an upward or raised position, as indicated in dotted lines in Fig. 1 and shown in full lines in Fig. 2.

The cover F has a cut-out portion or opening $F^3$ at the pivot or pintle $F'$ to allow of swinging the cover up and down over the front upper part of the spout A. The cover F is provided with a reinforcing-block $F^4$ adjacent to the cut-out portion $F^3$, and this reinforcing-block $F^4$ is adapted to engage a recess $A^5$, formed transversely in a longitudinally-extending flange or projection $A^6$ on the top of the spout, at the forward end thereof. The opening $A^4$ is somewhat larger than the diameter of the pivot $F'$, so that the cover F when swung upward into an upright position passes readily over the projection $A^6$ to bring the block $F^4$ in vertical alinement with the recess $A^5$, and when the operator now drops the cover the block $F^4$ passes into the recess $A^5$, and the cover is now locked in an upright position—that is, the cover is held against downward swinging to allow the operator to conveniently manipulate the bucket E for emptying the same of its contents and without being required to pay any attention whatever to the cover F and without disconnecting the cover from the spout.

When the bucket is emptied, then the operator slightly lifts the cover F to disengage the block F⁴ from the recess A⁵ and then swings the cover F downward into a protecting position over the bucket E.

The slot or opening A⁴, as shown in Figs. 1 and 2, extends from the front or base end of the spout rearwardly, the forward portion being narrow and the rear end enlarged for loosely receiving the pivot F' to allow raising and lowering of the cover when the latter is in an upright position, as above described.

The cover F is preferably provided with an offset F⁵ near the rear end, so as to shelter the base or forward end of the spout A against wind to prevent drying up of the sap within the spout and the bore.

The forward portion of the spout A at the opening or slot A⁴ is preferably reinforced by a band A⁷, encircling the front or base portion of the spout. A similar result—that is, locking the cover to the spout when in a raised position for the purpose described—may be obtained by other means—for instance, by swinging the cover upward and then shifting it transversely for the cover to abut against a part of the spout, as shown in Figs. 3 to 9.

When the bucket is emptied, then the operator shifts the cover F laterally back to its former position to bring the cut-out portion or opening F³ again in register with the forward upper end of the spout A to allow of swinging the cover F downward into protecting position over the bucket E.

In the modified form shown in Figs. 3 and 4 the spout or opening A⁸ is cut in from the top downwardly and forwardly, and the forward end is enlarged for holding the pivot F' in place at the time the cover is shifted transversely, and a solid portion of the cover rests on the forward wall of the upper end of the slot A⁷, as plainly shown in Fig. 4.

In the modified form illustrated in Fig. 5 the bayonet-slot G' of the spout G extends from the front end of the spout inwardly and upwardly to receive the pivot H' of the cover H. In this case the cover H when swung upward passes, with its opening H², over the top flange G² of the spout, and when the cover is then shifted laterally the solid portion of the rear end of the cover abuts against the said flange G² to hold the cover against downward swinging, the same as above described relative to the device shown in Figs. 2 and 4. The cover H when in a protecting position over the bucket E rests on the sides of the lip G³ of the spout, as indicated in Fig. 5.

In the modified form shown in Fig. 6 the spout I is provided with a bayonet-slot I', extending downwardly and rearwardly from the front end to receive the pivot J' at the rear end of the cover J, which rear end is also adapted to abut against the flange I² on the spout. In this case the lip I³ is very short and does not extend beyond the front end of the spout, and the cover J is now supported from the spout when in a lowermost position by resting with its rear end on the bottom walls of the slot I'.

In the modified form shown in Fig. 7 a similar arrangement is disclosed to the one shown in Fig. 6; but in this case the spout K is provided with a slot K', a lip K², and a flange K³ and the cover L is formed with a pivot L' and an opening L², having an extension L³ for the passage of the flange K³ at the time the cover is swung upward to allow shifting of the cover when in an uppermost position to cause the cover L to abut with a solid portion against the back of the flange K³, as will be readily understood by reference to Figs. 7 and 8.

In the modified form shown in Figs. 9 and 10 the cover N is hung on the spout O in any one of the various ways above described; but in this case the cover N is reinforced by transverse bars or ridges N' and has a pivot N² and an opening N³.

In the modified form shown in Figs. 11 and 12 the cover P is reinforced by a struck-up central portion P'; but otherwise the cover is provided with a pivot P² and an opening P³, the same as the pivot N² and the opening N³ shown in the cover illustrated in Fig. 9.

Having thus described my invention, I claim as new and desire to secure by Letters Patent—

1. A sap-spout and cover comprising a spout, and a cover mounted to swing on the spout, said cover having a rigid portion adapted to drop into interlocking engagement with a part of the spout when the cover is raised to hold the cover locked when in said position.

2. A sap-spout and cover comprising a spout having a projection on top, and a cover mounted to swing on the spout, said cover being adapted when elevated to drop bodily into interlocking engagement with said projection to lock the cover in position when in a raised position.

3. A sap-spout and cover comprising a spout having a large transverse opening and a recess on top, and a cover having a pivot of small diameter working in said opening, to allow the cover to play up and down on the spout for engaging the cover with the recess, to hold the cover locked when in a raised position.

4. A sap-spout and cover comprising a spout having a transverse opening of large diameter and a recessed projection on top, and a cover having a recess at its side and a pivot of small diameter at the outer side of said recess for loosely engaging said large opening in the spout to allow the cover to play up and down on the spout for engaging the cover with the recess in the said projection, to hold the cover locked when in a raised position, the portion of the cover for engaging the recess being reinforced.

5. A sap-spout and cover, comprising a spout having a transverse bayonet-slot near its front end and a recessed projection on its top side, and a cover having a pivot loosely engaging the said bayonet-slot, to removably connect the cover with the spout, and to allow of swinging the cover into an open position, said cover also having a part adapted to drop into and interlock with the recess in said projection by gravity, when the cover is in its uppermost position, whereby to lock the cover in said position.

6. A sap-spout and cover comprising a spout having a transverse downwardly-inclined slot and a cover having a recess at its side and a small pivot at the outer side of said recess for engaging the slot for the cover to swing on the spout and to move up and down thereupon, and to drop down bodily upon the spout when the cover is elevated, the spout being reinforced at the slot, and the cover having an offset for partially closing the open end of the spout.

7. A sap-spout and cover comprising a spout having a recessed portion on top of the spout and a transverse slot extending from the top downward and forward, and a cover having a pivot at its edge and an opening or cut-out portion immediately in the rear of the pivot, and a reinforced rear side for said opening, said reinforced side being adapted to drop into said recess by gravity when the cover is in its raised position to lock the cover in said position.

8. A sap-spout having at its outlet end an upwardly-extending shoulder and a lip extending forwardly from the lower side of said shoulder, said shoulder having a transverse slot, a cover having an opening in one side, a pivot at the outer side of said opening adapted to loosely engage said slot, said opening being of a size to easily receive said shoulder to permit the cover to move downwardly into engagement with said lip, and an offset on the cover for closing the open end of the shoulder portion of the spout above said lip.

9. A sap-spout and cover comprising a spout having a transverse slot with an enlarged inner end, said spout having a recessed projection above said enlarged end, a cover having an opening at one side thereof and a pivot at one side of the opening loosely received into said slot and normally working in said enlarged end thereof, the rear wall of the opening being adapted to drop into said recess by gravity when the cover is in its uppermost position to lock the cover in said position.

10. A sap-spout and cover, comprising a spout having a transverse opening and a recessed projection on top, and a cover having a pivot loosely engaging said opening to play up and down therein, to allow the cover to drop bodily to engage with said projection, to hold the cover locked when in a raised position.

11. A sap-spout and cover, comprising a spout having a transverse downwardly-inclined slot, and a cover having a pivot at its edge for engaging the slot for the cover to swing on the spout, the cover being cut away at the inner side of said pivot to form a recess in the cover whereby to adapt the cover to move up and down on the spout and to drop down bodily thereupon when the cover is elevated to its raised position, to bring the edge of the cover at the inner side of said recess into engagement with the top of the spout.

In testimony whereof I have signed my name to this specification in the presence of two subscribing witnesses.

GUSTAV HENRY GRIMM.

Witnesses:
ETTA M. REED,
EDWARD DANA.